United States Patent
Amano

(10) Patent No.: US 9,516,502 B2
(45) Date of Patent: Dec. 6, 2016

(54) COMMUNICATION APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Ryosuke Amano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/563,400

(22) Filed: Dec. 8, 2014

(65) Prior Publication Data

US 2015/0181425 A1    Jun. 25, 2015

(30) Foreign Application Priority Data

Dec. 25, 2013    (JP) .................................. 2013-268091

(51) Int. Cl.
    *H04W 12/06*    (2009.01)
    *H04W 4/00*    (2009.01)
    *H04W 12/08*    (2009.01)

(52) U.S. Cl.
    CPC ............. *H04W 12/06* (2013.01); *H04W 4/008* (2013.01); *H04W 12/08* (2013.01)

(58) Field of Classification Search
    CPC .................................................. H04W 12/06
    See application file for complete search history.

(56) References Cited

U.S. PATENT DOCUMENTS

| 2012/0092137 | A1* | 4/2012 | Buscemi | G06K 7/10237 340/10.51 |
| 2013/0029596 | A1* | 1/2013 | Preston | H04L 63/18 455/41.1 |
| 2015/0038130 | A1* | 2/2015 | Mao | H04W 8/22 455/418 |
| 2015/0163846 | A1* | 6/2015 | Weizman | H04W 76/043 455/41.2 |
| 2015/0271667 | A1* | 9/2015 | Bernsen | H04L 63/06 713/171 |

FOREIGN PATENT DOCUMENTS

| JP | 2007-221355 A | 8/2007 |
| JP | 2009-207069 A | 9/2009 |
| JP | 2011-182449 A | 9/2011 |

OTHER PUBLICATIONS

NFC Forum, Inc. & Bluetooth SIG, Inc., Bluetooth® Secure Simple Pairing Using NFC Application Document and Agreement, retrieved from http://nfc-forum.org/our-work/specifications-and-application-documents/application-documents/, retrieved Dec. 4, 2014, pp. 1-39.

* cited by examiner

*Primary Examiner* — Mazda Sabouri

(74) *Attorney, Agent, or Firm* — Carter, DeLuca, Farrell & Schmidt, LLP

(57) ABSTRACT

A communication apparatus performs wireless communication, determines whether an other communication apparatus is an apparatus that has received permission from a user, based on information written into a memory by the other communication apparatus via another type of wireless communication that differs from the wireless communication. The communication apparatus, in a case where it is determined that the other communication apparatus is an apparatus that has received permission from the user, performs the wireless communication with the other communication apparatus.

15 Claims, 5 Drawing Sheets

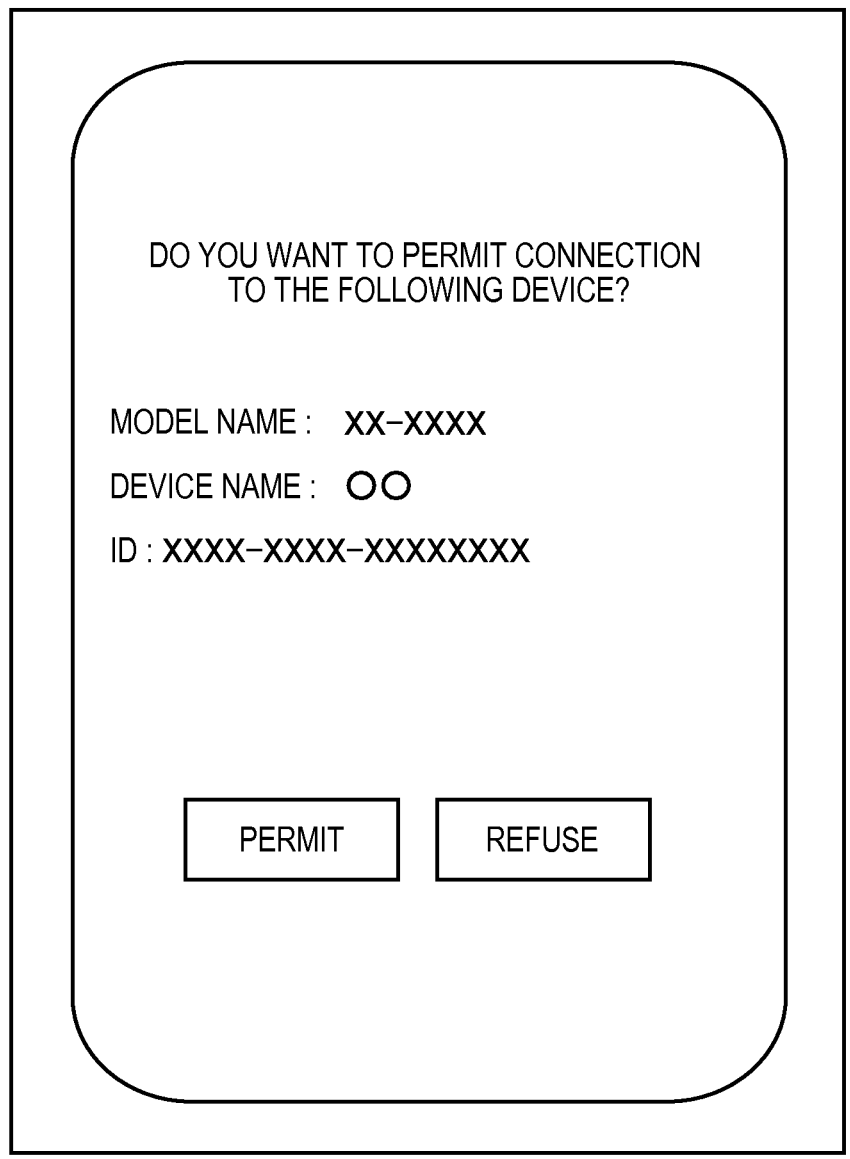

COMMUNICATION APPARATUS, METHOD FOR CONTROLLING THE SAME, AND NON-TRANSITORY COMPUTER-READABLE STORAGE MEDIUM

BACKGROUND OF THE INVENTION

Field of the Invention

The present invention relates to a communication apparatus that can perform data communication by establishing a one-to-one wireless link as a result of being approached by a partner apparatus such that the distance therebetween is within a predetermined range, a method for controlling the same, and a non-transitory computer-readable storage medium.

Description of the Related Art

In recent years, smartphones and the like have started utilizing close proximity wireless communication technologies such as Near Field Communication (NFC), Infrared Data Association (IrDA), and TransferJet™. Users are able to transmit and receive data such as image data and addresses between two smartphones simply by moving the devices close together (Japanese Patent Laid-Open No. 2007-221355).

The NFC Forum (http://www.nfc-forum.org), which is a NFC standards body, has standardized protocols for performing handover to wireless communication systems that differs from NFC such as Wireless Fidelity (Wi-Fi) and Bluetooth™. The NFC Forum defines two systems for handover in NFC, namely, negotiated handover and static handover. Negotiated handover is a system in which the two-way communication mode supported by NFC is used by a communication apparatus to negotiate a wireless communication system to handover to with a communication partner apparatus. On the other hand, static handover is a system in which the communication apparatus stores the wireless communication system to handover to in a NFC tag (hereinafter "tag"), and causes a reader/writer serving as the communication partner apparatus to load the wireless communication system.

By realizing handover using NFC, a fast Wi-Fi or Bluetooth communication path can be established simply by moving two smartphones close together, thus enabling bulk data to be transmitted and received (Japanese Patent Laid-Open No. 2009-207069, Japanese Patent Laid-Open No. 2011-182449). Cameras equipped with a tag are also being commercially produced, and a function for implementing handover to Wi-Fi by holding a smartphone equipped with a reader/writer in proximity to such a camera has been realized.

A method such as the following is available as a specific method of implementation in the case of handing over to Wi-Fi, using static handover as the system for handover in NFC. That is, this method involves the communication apparatus storing Wi-Fi communication parameter information (SSID, passphrase, etc.) in a tag, and establishing a Wi-Fi connection by causing a reader/writer serving as the communication partner apparatus to read the stored communication parameter information. There are security issues in the case of using this method of implementation, since communication parameter information on a tag could possibly be read out and a Wi-Fi connection established by the reader/writer of a third party that is not the original communication partner apparatus.

SUMMARY OF THE INVENTION

The present invention has been made in view of the above problems, and the present invention improves security at the time of performing communication.

According to one aspect of the present invention, there is provided a communication apparatus comprising: a communication unit configured to perform wireless communication; and a determination unit configured to determine whether an other communication apparatus is an apparatus that has received permission from a user, based on information written into a memory by the other communication apparatus via another type of wireless communication that differs from the wireless communication, wherein, in a case where the determination unit determines that the other communication apparatus is an apparatus that has received permission from the user, the communication unit performs the wireless communication with the other communication apparatus.

Further features of the present invention will become apparent from the following description of exemplary embodiments (with reference to the attached drawings).

BRIEF DESCRIPTION OF THE DRAWINGS

FIG. 6 shows an exemplary display screen of the camera 102 according to Embodiment 1.

DESCRIPTION OF THE EMBODIMENTS

Embodiment 1

Figure 1:
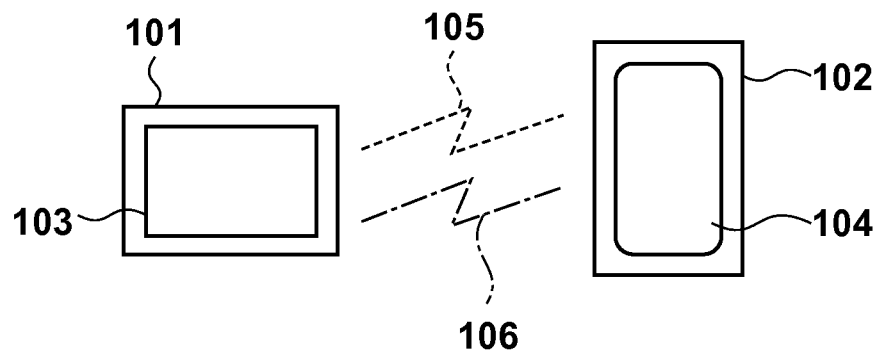
FIG. 1 is a system configuration diagram according to Embodiment 1.

FIG. 1 is a system configuration diagram according to the present embodiment. The system according to the present embodiment is constituted by a camera 101 and a mobile phone 102. The camera 101 has a touch panel 103 and the mobile phone 102 has a touch panel 104. The touch panels 103 and 104 are able to perform screen display to users and accept operations by users. Note that the camera 101 and the mobile phone 102 each have a computer (CPU) that controls the apparatus, and a memory that stores programs to be executed by the computer.

Data communication can be performed via close proximity wireless communication 105, as a result of the camera 101 approaching the mobile phone 102. Close proximity wireless communication 105 includes contactless IC card wireless communication utilizing electromagnetic induction, NFC (Near Field Communication) and communication utilizing induction fields, and has a maximum communication rate of a few hundred kbps and a communicable range of up to several centimeters. These communication systems enable communication between a reader/writer and a tag, with the reader/writer being able to implement read and write operations on a memory area embedded in the tag. Specifically, in the case where the reader/writer implements a read operation, the reader/writer transmits a read command to the tag, and the tag transmits a read response that includes data stored in the embedded memory to the reader/writer. Also, in the case where the reader/writer performs a write operation, the reader/writer transmits a write command that includes data to be written to the embedded memory of the tag to the tag, and the tag transmits a write response that includes information indicating whether or not writing to the embedded memory was successful.

Direct wireless communication or wireless communication via a relay device such as an Access Point (AP) can be performed between the camera 101 and the mobile phone 102 as short-range wireless communication 106. Short-range wireless communication 106 includes communication utilizing a wireless LAN conforming to IEEE 802.11 or Bluetooth™, and has a maximum communication rate of a few hundred Mbps and a communicable range of several tens of meters. When communication by short-range wireless communication 106 is started between devices, the respective devices are able to perform encryption, authentication and the like by setting communication parameters that include information on the encryption method, the encryption key, the authentication method, and the authentication key. Programs for executing this encryption/authentication include Wi-Fi Protected Access (WPA) that is standardized by the Wi-Fi Alliance, for example. Note that encryption/authentication may be performed with other methods, or a configuration may be adopted in which encryption/authentication is not performed.

Figure 2:
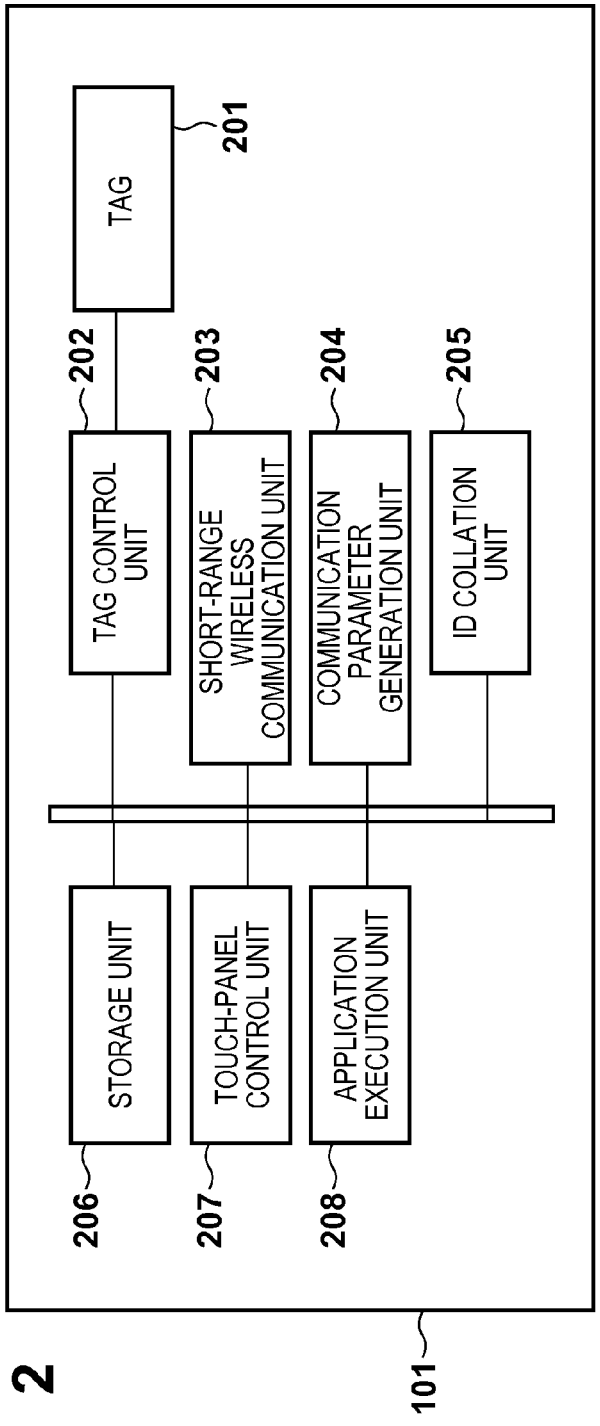
FIG. 2 is a functional block diagram of a camera 101 according to Embodiment 1.

FIG. 2 is a block diagram showing the configuration of the camera 101 according to the present embodiment. Each constituent element shown in FIG. 2 is realized by the CPU (not shown) of the camera 101 executing a program. A tag 201 executes processing in response to read/write operations by the reader/writer, using close proximity wireless communication 105. The tag 201 is equipped with an internal memory, and data can be read from or written to this memory by a tag control unit 202 or the reader/writer. The tag control unit 202 performs reading/writing with respect to the memory of the tag 201. The tag control unit 202 is also able to detect a write operation to the memory of the tag 201 by the reader/writer. Note that the tag control unit 202 may also detect an electric field of the reader/writer, receive a polling command from the reader/writer, or detect a read operation by the reader/writer.

A short-range wireless communication unit 203 performs short-range wireless communication 106. The short-range wireless communication unit 203 establishes a short-range wireless connection with a communicable apparatus that exists within communication range by transmitting a connection request to the communicable apparatus or receiving a connection request from the communicable apparatus. A communication parameter generation unit 204 generates a communication parameter that is used in connecting by short-range wireless communication 106. The communication parameter generated by the communication parameter generation unit 204 is written to the memory of the tag 201 in a form that can be interpreted by the reader/writer. For example, in the case where Wi-Fi is used as short-range wireless communication 106, a form conforming to the Out-of-Band Interface specification of the Wi-Fi Simple Configuration (WSC) technical specification standardized by the Wi-Fi Alliance is used.

An ID collation unit 205 collates an ID written in the memory of the tag 201 by the reader/writer with IDs stored in the storage unit 206. In the present embodiment, an ID is described as being a device identifier that identifies the device on the reader/writer side, but other identification information may be used, such as a user identifier that identifies the user of the device or an interface identifier that identifies the interface of close proximity wireless communication 105 or short-range wireless communication 106. The ID may also be a random value. A storage unit 206 stores an ID written to the tag 201 by the reader/writer. Note that the storage unit 206 may store communication parameters used in communication with the device corresponding to each ID in association with the ID. A touch-panel control unit 207 controls the touch panel 103 of the camera 101. The touch-panel control unit 207 has a function of controlling screen display of the touch panel 103, and a function of detecting operation of the touch panel 103 by a user. An application execution unit 208 executes various types of application software. Processing for acquiring an image from the mobile phone 102 via short-range wireless communication 106 is given as a specific example of the processing that is implemented by application software.

Figure 3:
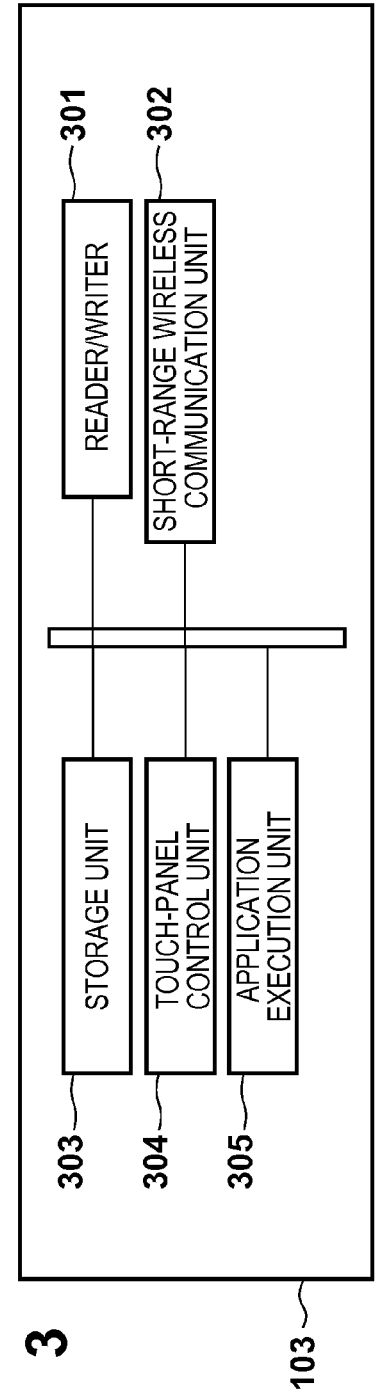
FIG. 3 is a functional block diagram of a mobile phone 102 according to Embodiment 1.

FIG. 3 is a block diagram showing the configuration of the mobile phone 102 according to the present embodiment. A reader/writer 301 performs read and write operations on a tag using close proximity wireless communication 105. The reader/writer 301 detects communicable apparatuses by periodically transmitting a polling command to tags and receiving a polling response from tags that are within a communicable range. The reader/writer 301 implements read/write operations on a tag by transmitting a read command or a write command to the tag. A short-range wireless communication unit 302 performs short-range wireless communication 106. The short-range wireless communication unit 302 designates a communicable apparatus that exists within a communicable range, or establishes a short-range wireless connection with a communicable apparatus by being designated by the communicable apparatus. In addition, the short-range wireless communication unit 302, a storage unit 303, a touch-panel control unit 304 and an application execution unit 305 respectively have similar functions to the short-range wireless communication unit 203, the storage unit 206, the touch-panel control unit 207 and the application execution unit 208.

Figure 4:
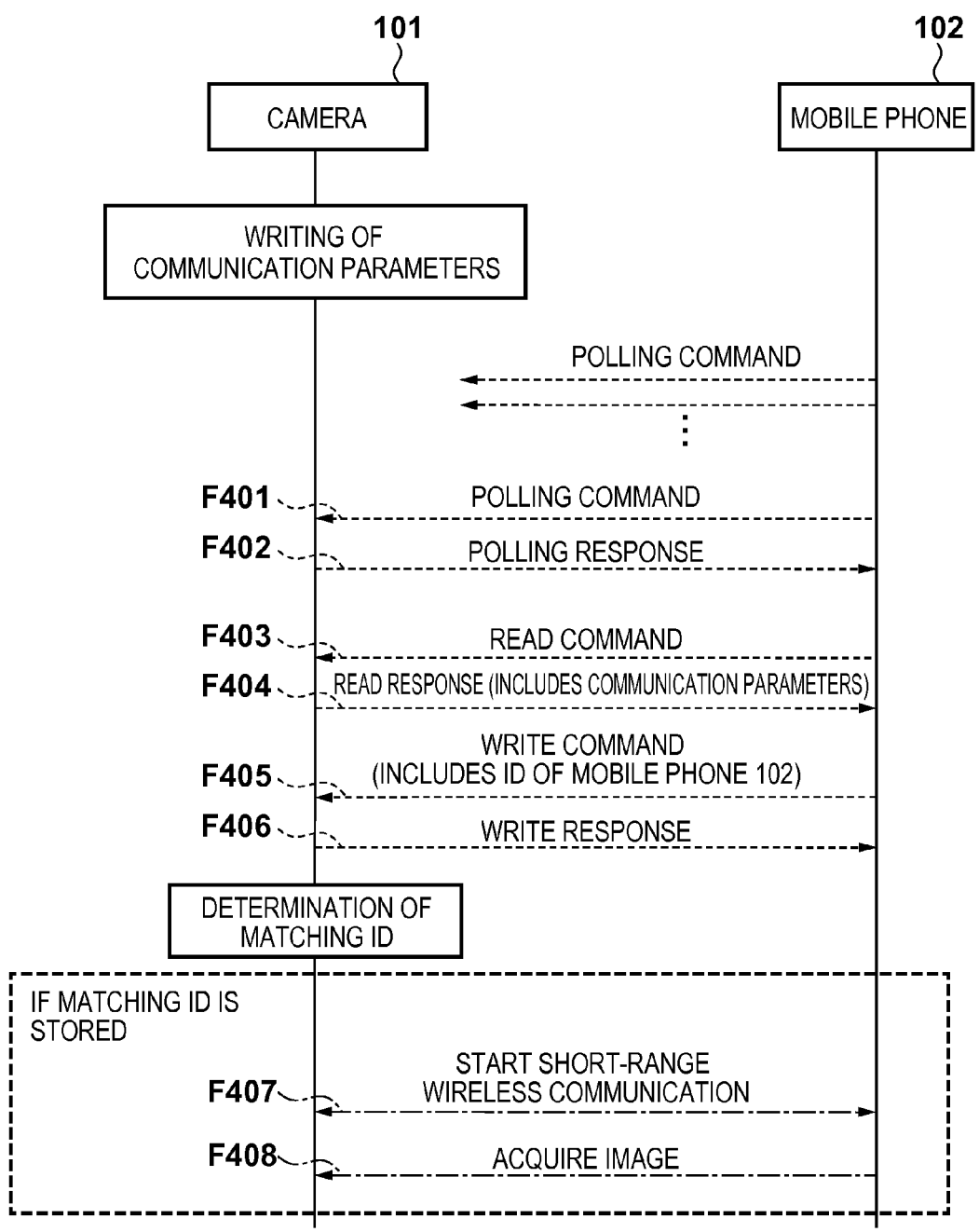
FIG. 4 is a sequence chart of the camera 101 and the mobile phone 102 according to Embodiment 1.

Hereinafter, a sequence of the present embodiment will be described with FIG. 4. FIG. 4 is a sequence chart of the camera 101 and the mobile phone 102 according to the present embodiment. In FIG. 4, in an initial state, the camera 101 and the mobile phone 102 are disposed far enough away from each other to not be able to communicate by close proximity wireless communication 105, and the reader/writer 301 periodically transmits a polling command for detecting the tag 201 (F401). Also, the camera 101 has written communication parameters generated by the communication parameter generation unit 204 to the memory of the tag 201. In this state, the user moves the mobile phone 102 close to the camera 101 so that the distance between the camera 101 and the mobile phone 102 is within a predetermined communicable range. At this point, the mobile phone 102 detects the camera 101 by receiving a response to the polling command from the tag 201 (F402). The mobile phone 102 transmits a read command to the detected camera 101 (F403), and acquires memory data stored in the tag 201 of the camera 101 (F404).

Subsequently, the mobile phone 102 writes data including the ID of the mobile phone 102 to the memory of the tag 201 by transmitting a write command to the camera 101 (F405). The tag 201 transmits a response to the received write command (F406). At this point, the camera 101 is able to detect the mobile phone 102 by the tag control unit 202 detecting the electric field of the reader/writer 301 or receiving the polling command from the reader/writer, and detecting a read operation by the reader/writer 301. Also, the camera 101 is able to acquire memory data stored in the tag including the ID of the mobile phone 102. The camera 101 collates the ID of the mobile phone 102 with IDs stored in the storage unit 206, and checks whether there is a matching ID. In the case where the ID of the mobile phone 102 is stored in the storage unit 206, the camera 101 implements short-range wireless communication 106 with the mobile phone 102, using the communication parameters written in advance into the memory of the tag 201 (F407). Thereafter, the camera 101 performs data transfer of image files or the like with the mobile phone 102 (F408).

Figure 5:
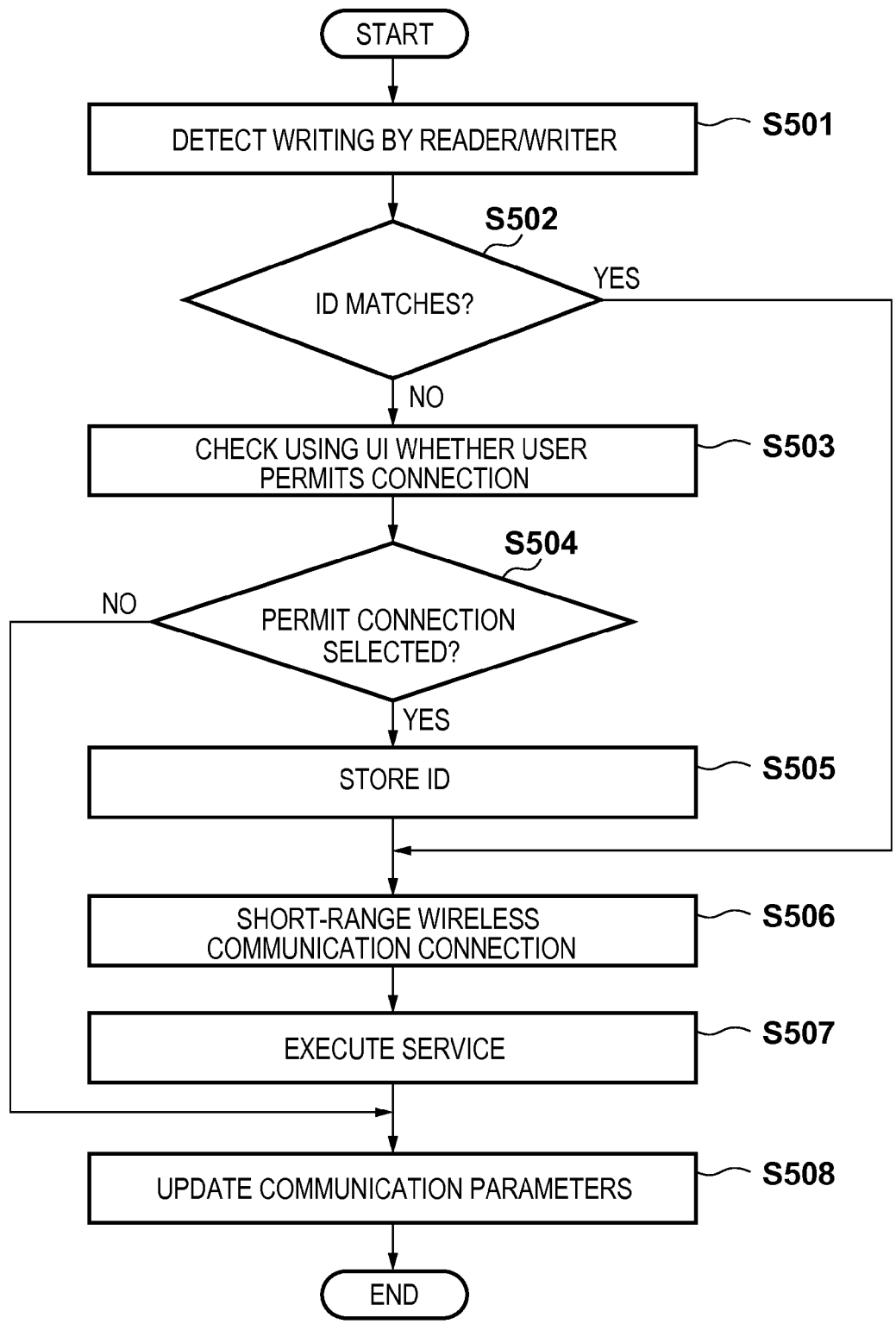
FIG. 5 is an operation flowchart of the camera 102 according to Embodiment 1.

Hereinafter, operations of the camera 101 according to the present embodiment will be described with FIG. 5. FIG. 5 is an operation flowchart of the camera 101 according to the present embodiment. In FIG. 5, it is assumed that, in an initial state, the camera 101 stores communication parameters generated by the communication parameter generation unit 204 in the memory of the tag 201, and communication using close proximity wireless communication 105 has not started. The camera 101 acquires the ID of the mobile phone 102 written into the memory of the tag 201 when the tag control unit 202 detects data writing to the memory of the tag 201 by the mobile phone 102 via close proximity wireless communication 105 (S501). The camera 101 determines, with the ID collation unit 205, whether the acquired ID of the mobile phone 102 is stored in the storage unit 206 (S502).

If the ID collation unit 205 determines that the acquired ID of the mobile phone 102 is not stored in the storage unit 206 (N at S502), the camera 101 performs display such as that shown in FIG. 6 on the touch panel 103. This is to check with UI (user interface) whether connection by short-range wireless communication 106 is permitted by the user (S503). FIG. 6 shows an exemplary screen that is displayed on the touch panel 103 of the camera 101, with the user being able to select "permit" or "refuse". If the touch-panel control unit 207 determines that the user has permitted connection (Y at S504), the camera 101 stores the ID of the mobile phone 102 in the storage unit 206 (S505). The camera 101 then starts connection of short-range wireless communication 106 with the mobile phone 102 using the communication parameters stored in the memory of the tag 201 in the initial state (S506). Once short-range wireless communication 106 is established, the camera 101 implements a service such as image file transfer or the like with the mobile phone 102 (S507). Once the service is completed, the camera 101 newly generates communication parameters with the communication parameter generation unit 204, writes the newly generated communication parameters to the memory of the tag 201 (S508), and returns to an initial state.

On the other hand, in the case where the ID collation unit 205 determines, at 5502, that the acquired ID of the mobile phone 102 is stored in the storage unit 206 (Y at S502), the camera 101 implements the processing from S506. Also, in the case where the touch-panel control unit 207 determines, at 5504, that connection was not permitted by the user (N at S504), the camera 101 implements the processing from S508.

Note that in the case where the ID of the mobile phone 102 is not written into the memory of the tag 201 during the fixed time period at 5501, the camera 101 may implement the processing from S508. Also, in the case where the ID of the mobile phone 102 is not written into the memory of the tag 201 during the fixed time period at 5501, the camera 101 may acquire the ID after waiting for writing of the ID from the mobile phone 102 to be completed. This also applies to the case where data that does not include an ID is written into the memory of the tag 201 at 5501.

The camera 101 may hold a state showing whether short-range wireless communication 106 and services can be implemented, and may write this state to the memory of the tag 201 in the initial state. In this case, the mobile phone 102 is able to confirm in advance whether implementation of short-range wireless communication 106 and services by the camera 101 is possible from the read operation. Also, the camera 101 may write a state indicating that short-range wireless communication 106 and services cannot be implemented to the memory of the tag 201, after the ID of the mobile phone 102 is acquired at 5501 or when short-range wireless communication 106 is started at S506. In this case, the mobile phone 102 is able to confirm whether implementation of short-range wireless communication 106 and services by the camera 101 is possible from the read operation performed at the time of S501 or S506. Also, a configuration may be adopted in which the camera 101 writes a state indicating whether short-range wireless communication 106 and services can be implemented to the memory of the tag 201 at another timing, and the mobile phone 102 confirms this state from the read operation in response thereto.

The camera 101 may implement processing for updating the communication parameters at 5508 immediately after acquiring the ID of the mobile phone 102 at 5501. Also, at 5505, the camera 101 may store the ID of the mobile phone 102 in the storage unit 206 in association with the communication parameters stored in the memory of the tag 201 in the initial state, and may, at 5506, implement short-range wireless communication 106 with the mobile phone 102 using the communication parameters associated with the ID.

As described above, according to the present embodiment, rather than connecting unconditionally to a device that has approached nearby using short-range wireless communication, device IDs are compared and connection to a device that is permitted by the user is not performed, thus enabling a situation where an unauthorized device is connected by a malicious third party to be avoided. Also, power consumption relating to short-range wireless communication can be suppressed by not performing short-range wireless communication unconditionally with partner devices that have approached nearby. Also, a communication apparatus equipped with a tag can be prevented from connecting to other communication apparatuses that are not trustworthy.

As a result of a state indicating whether the device can provide short-range wireless communication and services to a partner device being notified to the partner device, the fact that implementation of short-range wireless communication and services has failed can be notified to the user, improving user friendliness. Also, a configuration may be adopted in which the communication apparatus only waits for an operation checking whether connection is permitted by the user when connecting for the first time, and omits the connection permission checking operation when connecting for the second time onwards. Operability can be thereby improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-268091, filed Dec. 25, 2013 which is hereby incorporated by reference herein in its entirety.

What is claimed is:

1. A communication apparatus comprising:
a first communicator for performing wireless communication by a first communication method for which a communication partner apparatus accesses a storage unit included in the communication apparatus;
a second communicator for performing wireless communication by a second communication method having a higher communication speed or a larger communication range than the first communication method; and
at least one processor that implements units, wherein the units comprise:
a transmission unit configured to, in a case where the first communicator receives a read command from the communication partner apparatus if a communication parameter for connecting via the second communicator is stored in the storage unit, transmit the communication parameter via the first communicator; and
a control unit configured to, in a case where the first communicator receives a write command from the communication partner apparatus after the transmission unit transmits the communication parameter,
if identification information that meets a predetermined requirement is written in the storage unit via the first communicator, execute a connection process based on the communication parameter via the second communicator, and
if the identification information is not written in the storage unit via the first communicator, limit to execute the connection process via the first communicator.

2. The communication apparatus according to claim 1, wherein the control unit, if the identification information written in the storage unit from the communication partner apparatus is identification information previously stored in the communication apparatus, executes the connection process based on the communication parameter via the second communicator.

3. The communication apparatus according to claim 1, wherein the control unit, in a case where, the identification information is not written in the storage unit via the first communicator, if a connection with the communication partner apparatus is permitted by a user, execute the connection process based on the communication parameter via the second communicator, and
if the connection is not permitted by a user, does not execute the connection process.

4. The communication apparatus according to claim 1, wherein the at least one processor stores, in the storage unit, another communication parameter different from the communication parameter after the transmission unit transmits the communication parameter and the first communicator receives the write command from the communication partner apparatus.

5. The communication apparatus according to claim 1, wherein the identification information is an identifier identifying an apparatus.

6. The communication apparatus according to claim 1, wherein the identification information is an identifier identifying a user of an apparatus.

7. The communication apparatus according to claim 1, wherein the identification information is an identifier identifying an interface of wireless communication.

8. The communication apparatus according to claim 1, wherein the at least one processor stores, in the storage unit, another communication parameter different from the communication parameter after the transmission unit transmits the communication parameter and communication with the communication partner apparatus via the second communicator is completed.

9. The communication apparatus according to claim 1, wherein the at least one processor stores, in the storage unit, information indicating that communication is not available via the second communicator if the communication apparatus is in a state in which communication via the second communicator is not available.

10. The communication apparatus according to claim 1, wherein the second communication method is any one of IEEE 802.11 series or Bluetooth.

11. The communication apparatus according to claim 1, wherein the first communication method is a communication method conformable to Near Field Communication (NFC).

12. A method for controlling a communication apparatus, comprising:
transmitting, in a case where a read command is received from a communication partner apparatus using a first communication method if a communication parameter for connecting by a second communication method is stored in a storage unit included in the communication apparatus, the communication parameter using the first communication method, wherein the first communication method is a communication method for which the communication partner apparatus accesses the storage unit and the second communication method is a communication method having a higher communication speed or a larger communication range than the first communication method; and
controlling to, in a case where a write command is received from the communication partner apparatus using the first communication method after transmitting the communication parameter,
if identification information that meets a predetermined requirement is written in the storage unit using the first communication method, execute a connection process based on the communication parameter using the second communication method, and if the identification information is not written in the storage unit using the first communication method, limit to execute the connection process using the first communication method.

13. A non-transitory computer-readable storage medium storing a computer program for controlling a computer to execute a method for controlling a communication apparatus, the method comprising:

transmitting, in a case where a read command is received from a communication partner apparatus using a first communication method if a communication parameter for connecting by a second communication method is stored in a storage unit included in the communication apparatus, the communication parameter using the first communication method, wherein the first communication method is a communication method for which the communication partner apparatus accesses the storage unit and the second communication method is a communication method having a higher communication speed or a larger communication range than the first communication method; and controlling to, in a case where a write command is received from the communication partner apparatus using the first communication method after transmitting the communication parameter, if identification information that meets a predetermined requirement is written in the storage unit using the first communication method, execute a connection process based on the communication parameter using the second communication method, and if the identification information is not written in the storage unit using the first communication method, limit to execute the connection process using the first communication method.

14. The communication apparatus according to claim 1, wherein the units further comprise a determination unit configured to determine whether the communication partner apparatus is an apparatus that has received a permission from a user, based on the identification information, and wherein the control unit executes the connection process based on the communication parameter via the second communicator if the determination unit determines that the communication partner apparatus is an apparatus that has received the permission.

15. The communication apparatus according to claim 1, wherein the communication parameter comprises at least one of an SSID, a pathphrase, an authentication method, and a key.

* * * * *